US011685847B2

(12) United States Patent
Jensen et al.

(10) Patent No.: US 11,685,847 B2
(45) Date of Patent: Jun. 27, 2023

(54) ADHESIVE GELS FOR RESPIRATORY MASKS

(71) Applicant: Seal Solutions, LLC, Fremont, WI (US)

(72) Inventors: Sandra Jensen, Green Bay, WI (US); Kathryn Weiher, Fremont, WI (US)

(73) Assignee: Seal Solutions, Inc., Fremont, WI (US)

( * ) Notice: Subject to any disclaimer, the term of this patent is extended or adjusted under 35 U.S.C. 154(b) by 251 days.

(21) Appl. No.: 17/116,643

(22) Filed: Dec. 9, 2020

(65) Prior Publication Data

US 2022/0177750 A1  Jun. 9, 2022

(51) Int. Cl.
*C09J 139/06* (2006.01)
*C08L 33/08* (2006.01)
*C08L 39/06* (2006.01)
*C08L 71/02* (2006.01)
*C08K 5/053* (2006.01)

(52) U.S. Cl.
CPC ............. *C09J 139/06* (2013.01); *C08L 33/08* (2013.01); *C08L 39/06* (2013.01); *C08L 71/02* (2013.01); *C08K 5/053* (2013.01)

(58) Field of Classification Search
CPC ....... C09J 139/06; C08L 33/02; C08L 33/064; C08L 39/06; C08L 139/06; C08L 71/02
See application file for complete search history.

(56) References Cited

U.S. PATENT DOCUMENTS

| 4,670,254 A * | 6/1987 | Kamishita | A61K 31/19 |
| | | | 514/567 |
| 5,578,661 A * | 11/1996 | Fox | A61L 15/60 |
| | | | 525/203 |
| 2005/0003012 A1 * | 1/2005 | Woller | C08L 39/06 |
| | | | 525/205 |
| 2007/0280972 A1 * | 12/2007 | Zhang | A61P 17/00 |
| | | | 514/168 |
| 2008/0008750 A1 * | 1/2008 | Tochio | A61K 9/4816 |
| | | | 424/454 |
| 2012/0301517 A1 * | 11/2012 | Zhang | A61K 31/473 |
| | | | 514/330 |

FOREIGN PATENT DOCUMENTS

JP          2012062354 A  *  3/2012

OTHER PUBLICATIONS

Definition of glyceride. IUPAC Compendium of Chemical Terminology. 2014. (Year: 2014).*
Machine Translation of JP2012-062354A. Mar. 29, 2012. (Year: 2012).*

* cited by examiner

Primary Examiner — Stephen E Rieth

(57) ABSTRACT

Adhesives for use on user-to-mask interfaces of a respiratory mask and methods of preparing the same are provided. The adhesive includes greater than or equal to about 1 wt. % to less than or equal to about 15 wt. % of one or more glycerides; greater than or equal to about 0.50 wt. % to less than or equal to about 5 wt. % of one or more polyacrylates; greater than or equal to about 1 wt. % to less than or equal to about 10 wt. % of one or more polyethers; greater than or equal to about 25 wt. % to less than or equal to about 45 wt. % of one or more N-vinylpyrrolidone polymers; and a balance of water. The method includes forming a first aqueous mixture, forming a second aqueous mixture, and admixing the first aqueous mixture and the second aqueous mixture to form a substantially homogeneous mixture that defines the adhesive.

9 Claims, 1 Drawing Sheet

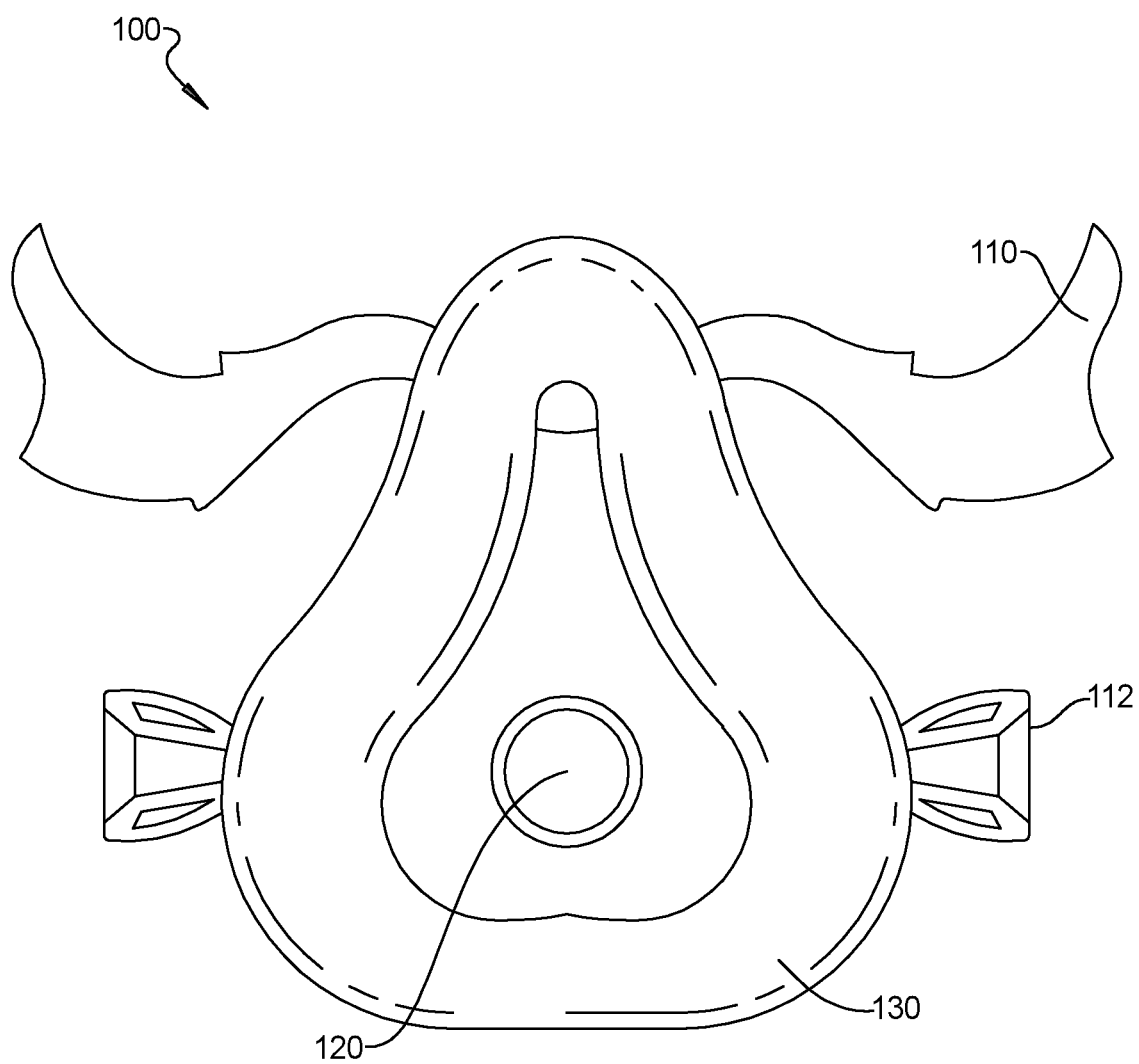

ADHESIVE GELS FOR RESPIRATORY MASKS

FIELD

The present disclosure relates to adhesive gels for use with respiratory masks, including masks configured to be used with positive airway pressure devices, and methods of formation for such adhesive gels.

BACKGROUND

This section provides background information related to the present disclosure which is not necessarily prior art.

Positive airway pressure devices, including for example, bi-level positive airway pressure devices and continuous positive airway pressure devices, are often used in the treatment of respiratory conditions and various sleep disorders, such as sleep apnea. Various respiratory masks are configured for use of the positive airway pressure devices, including for example nasal pillows, nasal masks, and full face masks. Effective application of respiratory therapies and treatments using positive airway pressure devices requires that the selected respiratory mask be continuously sealed against the face, especially when the body is repositioned and/or changes in pressure are experienced. Because of the variety of facial configurations, including for example various levels of facial hair, leaks are commonly experienced during use of the positive airway pressure devices and, in certain instances, effective user-to-mask seals are attained only with considerable discomfort to the wearer. Accordingly, it would be desirable to develop materials and devices that improve the seal and comfort of the respiratory mask and the effectiveness of various respiratory therapies and treatments using the respiratory mask.

SUMMARY

This section provides a general summary of the disclosure, and is not a comprehensive disclosure of its full scope or all of its features.

In various aspects, the present disclosure provides an adhesive for use on a user-to-mask interface of a respiratory mask. The adhesive may include greater than or equal to about 1 wt. % to less than or equal to about 15 wt. % of one or more glycerides; greater than or equal to about 0.50 wt. % to less than or equal to about 5 wt. % of one or more polyacrylates; greater than or equal to about 1 wt. % to less than or equal to about 10 wt. % of one or more polyethers; greater than or equal to about 25 wt. % to less than or equal to about 45 wt. % of one or more N-vinylpyrrolidone polymers; and a balance of water.

In one aspect, the one or more glycerides includes glycerol ($C_3H_8O_3$).

In one aspect, the one or more polyethers includes poly(ethylene glycol) $((C_2H_4O)_nH_2O)$.

In one aspect, the one or more N-vinylpyrrolidone polymers includes polyvinylpyrrolidone.

In one aspect, the adhesive further includes greater than or equal to about 0.10 wt. % to less than or equal to about 3 wt. % of one or more amines.

In one aspect, the one or more amines include triethylamine.

In one aspect, the adhesive further includes greater than or equal to about 5 wt. % to less than or equal to about 40 wt. % of one or more alcohols.

In one aspect, the one or more alcohols includes ethanol.

In various other aspects, the present disclosure provides another adhesive for use on a user-to-mask interface of a respiratory mask. The adhesive includes greater than or equal to about 3 wt. % to less than or equal to about 12 wt. % of glycerol ($C_3H_8O_3$); greater than or equal to about 0.70 wt. % to less than or equal to about 3 wt. % of one or more polyacrylates; greater than or equal to about 2 wt. % to less than or equal to about 5 wt. % of poly(ethylene glycol) $((C_2H_4O)_nH_2O)$; greater than or equal to about 30 wt. % to less than or equal to about 40 wt. % of polyvinylpyrrolidone; and a balance of water.

In one aspect the adhesive further includes greater than or equal to about 0.50 wt. % to less than or equal to about 2 wt. % of triethylamine; and greater than or equal to about 10 wt. % to less than or equal to about 35 wt. % ethanol.

In various other aspects, the present disclosure provides a method for forming an adhesive for use on a user-to-mask interface of a respiratory mask. The method includes forming a first aqueous mixture, forming a second aqueous mixture, and admixing the first aqueous mixture and the second aqueous mixture to form a substantially homogeneous mixture that defines the adhesive. The first aqueous mixture includes greater than or equal to about 1 wt. % to less than or equal to about 15 wt. % of one or more glycerides, greater than or equal to about 0.50 wt. % to less than or equal to about 5 wt. % of one or more polyacrylates, greater than or equal to about 1 wt. % to less than or equal to about 10 wt. % of one or more polyethers, greater than or equal to about 25 wt. % to less than or equal to about 45 wt. % of one or more N-vinylpyrrolidone polymers, and a balance of water. The second aqueous mixture includes greater than or equal to about 0.50 wt. % to less than or equal to about 5 wt. % of one or more polyacrylates, greater than or equal to about 0.10 wt. % to less than or equal to about 3 wt. % of one or more amines, and a balance of water.

In one aspect, the second aqueous mixture further includes greater than or equal to about 5 wt. % to less than or equal to about 40 wt. % of one or more alcohols.

In one aspect, the one or more glycerides includes glycerol ($C_3H_8O_3$); the one or more polyethers includes poly(ethylene glycol) $((C_2H_4O)_nH_2O)$; the one or more N-vinylpyrrolidone polymers includes polyvinylpyrrolidone; and the one or more amines include triethylamine.

In one aspect, the second aqueous mixture further includes greater than or equal to about 5 wt. % to less than or equal to about 40 wt. % of ethanol.

In one aspect, forming the second aqueous mixture includes: admixing the one or more polyacrylates and the triethylamine to form a first submixture; contacting the ethanol and water to the first submixture to form a second submixture; and admixing the second submixture to form a substantially homogeneous mixture that defines the second aqueous mixture.

In one aspect, the first mixture further includes greater than or equal to about 0.10 wt. % to less than or equal to about 3 wt. % of one or more amines and greater than or equal to about 5 wt. % to less than or equal to about 40 wt. % of one or more alcohols.

In one aspect, forming the first aqueous mixture includes: admixing the one or more glycerides and water to form a first submixture; admixing the first submixture and one or more polyacrylates to form a second submixture; admixing the second submixture and the one or more amines to form a third submixture; and admixing the third submixture and the one or more polyethers, the one or more N-vinylpyrrolidone polymers, and the one or more alcohols to form a substantially homogeneous mixture that defines the first aqueous mixture.

Further areas of applicability will become apparent from the description provided herein. The description and specific examples in this summary are intended for purposes of illustration only and are not intended to limit the scope of the present disclosure.

DRAWING

The drawing described herein is for illustrative purposes only of selected embodiments and not all possible implementations, and is not intended to limit the scope of the present disclosure.

FIG. 1 is a schematic illustration of an exemplary respiratory mask configured to be used with positive airway pressure devices.

Corresponding reference numerals indicate corresponding parts in the drawing.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having", are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to", or "coupled to" another element or layer, it may be directly on, engaged, connected, or coupled to the other element or layer, or intervening elements or layers may be present. In contrast, when an element is referred to as being "directly on", "directly engaged to," "directly connected to", or "directly coupled to" another element or layer, there may be no intervening elements or layers present. Other words used to describe the relationship between elements should be interpreted in a like fashion (e.g., "between" versus "directly between", "adjacent" versus "directly adjacent", etc.). As used herein, the term "and/or" includes any and all combinations of one or more of the associated listed items.

Although the terms first, second, third, etc. may be used herein to describe various elements, components, regions, layers and/or sections, these elements, components, regions, layers, and/or sections should not be limited by these terms. These terms may be only used to distinguish one element, component, region, layer, or section from another element, component, region, layer, or section. Terms such as "first", "second", and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner", "outer", "beneath", "below", "lower", "above", "upper", and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure relates to gel adhesives for respiratory masks, including masks configured to be used with positive airway pressure devices, such as bi-level positive airway pressure devices and continuous positive airway pressure devices. Such masks include, for example, nasal pillows, nasal masks, and full face masks. Because of the variety of facial configurations, including for example various levels of facial hair, leaks are commonly experienced during use of the positive airway pressure devices and, in certain instances, effective user-to-mask seals are attained only with considerable discomfort to the wearer.

The gel adhesive of the present disclosure substantially eliminates leakage during use of the respiratory masks, for example, during pressurization during positive airway pressure therapy. The gel adhesive may substantially eliminate leakage occurring at the user-to-mask interface. Improving the user-to-mask interface, while maintaining the comfortableness for the user, improves the consistency of use of the respiratory masks and the applied therapies, including positive airway pressure devices and related therapies. Improving the consistency of use, as well as the effectiveness of the applied therapy, decreases the occurrence of various health risks, such as cardiac disease, stroke, mood disorders, diabetes, hypertension, weight gain, and memory loss, that can occur due to various sleep disorders.

An exemplary respiratory mask 100 for a positive airway pressure ("PAP") system is illustrated in FIG. 1. The respiratory mask 100 includes one or more straps or buckles 110, 112 that secure the respiratory mask 100 to the user, for example between the user's nasal bridge and chin. The respiratory mask 100 has at least one inlet 120 that receives, for example, air from a positive airway pressure device, and further includes a liner 130 that is configured to cushion the user-to-mask interface. A gel adhesive may be applied, for example as a thin layer, to the liner 130 to secure or seal the user-to-mask interface. The gel adhesive may include a mixture of glycerides, polyacrylates, polyethers, and N-vinylpyrrolidone polymers. In certain aspects, the gel adhesive may further comprise one or more amines and alcohols. In each instance, the gel adhesive includes a balance of water.

In various aspects, the gel adhesive may include greater than or equal to about 1 wt. % to less than or equal to about 15 wt. %, and in certain aspects, optionally greater than or equal to about 3 wt. % to less than or equal to about 12 wt. %, of one or more glycerides, for example glycerol ($C_3H_8O_3$); greater than or equal to about 0.50 wt. % to less than or equal to about 5 wt. %, and in certain aspects, greater than or equal to about 0.70 wt. % to less than or equal to about 3 wt. %, of one or more polyacrylates, for example CARBOPOL® Ultrez 21 Polymer and/or AVALURE™ AC 210 Polymer; greater than or equal to about 1 wt. % to less than or equal to about 10 wt. %, and in certain aspects, greater than or equal to about 2 wt. % to less than or equal to about 5 wt. %, of one or more polyethers, for example poly(ethylene glycol) (($C_2H_4O)_nH_2O$), such as PEG 300; and greater than or equal to about 25 wt. % to less than or equal to about 45 wt. %, and in certain aspects, greater than or equal to about 30 wt. % to less than or equal to about 40 wt. %, of one or more N-vinylpyrrolidone polymers, for example polyvinylpyrrolidone, such as K90 solution (20%).

In certain aspects, the gel adhesive may further include greater than or equal to about 0.10 wt. % to less than or equal to about 3 wt. %, and in certain aspects, optionally greater than or equal to about 0.50 wt. % to less than or equal to about 1.50 wt. %, of one or more amines, for example triethylamine or triethanolamine; and greater than or equal to about 5 wt. % to less than or equal to about 40 wt. %, and in certain aspects, optionally greater than or equal to about 10 wt. % to less than or equal to about 35 wt. %, of one or more alcohols, for example ethanol.

In various aspects, the present disclosure provides a method for fabricating a gel adhesive for use with respiratory masks. The method includes forming a first aqueous mixture comprising one or more glycerides, one or more polyacrylates, one or more polyethers, and one or more N-vinylpyrrolidone polymers. For example, the first aqueous mixture may comprise greater than or equal to about 1 wt. % to less than or equal to about 15 wt. % of the one or more glycerides; greater than or equal to about 0.50 wt. % to less than or equal to about 5 wt. % of the one or more polyacrylates; greater than or equal to about 1 wt. % to less than or equal to about 10 wt. % of the one or more polyethers; greater than or equal to about 25 wt. % to less than or equal to about 45 wt. % of the one or more N-vinylpyrrolidone polymers; and a balance of water. The one or more glycerides may include, for example, glycerol ($C_3H_8O_3$). The one or more polyacrylates may include, for example, CARBOPOL® Ultrez 21 Polymer and/or AVALURE™ AC 210 Polymer. The one or more polyethers may include, for example, poly(ethylene glycol) (($C_2H_4O)_nH_2O$), such as PEG 300. The one or more N-vinylpyrrolidone polymers may include, for example, polyvinylpyrrolidone, such as K90 solution (20%).

In certain aspects, the first aqueous mixture may further comprise one or more amines and one or more alcohols. For example, the first aqueous mixture may further comprise greater than or equal to about 0.10 wt. % to less than or equal to about 3 wt. % of the one or more amines and greater than or equal to about 5 wt. % to less than or equal to about 40 wt. % of the one or more alcohols. The one or more amines may include, for example, triethylamine or triethanolamine. The one or more alcohols may include, for example, ethanol.

In various aspects, forming the first aqueous mixture includes admixing the one or more glycerides and water to form a first submixture. The one or more polyacrylates may be admixed with the first submixture to form a second submixture. For example, the one or more polyacrylates may be admixed with the first submixture until fully dissolved within the first submixture so as to form the second submixture. The one or more polyacrylates may be admixed with the first submixture in a manner so as to limit or avoid bubble formation during the mixing process. The method further includes admixing the one or more amines with the second submixture to form a third submixture. The third submixture may be substantially homogeneous and may have a thicker consistency (e.g., higher viscosity) than that of the first submixture. The third submixture may be admixed with the one or more polyethers, the one or more N-vinylpyrrolidone polymers, and the one or more alcohols to form a substantially homogeneous mixture that defines the first aqueous mixture.

In various aspects, the method further includes forming a second mixture comprising one or more polyacrylates and one or more amines. For example, the second aqueous mixture may comprise greater than or equal to about 0.50 wt. % to less than or equal to about 5 wt. % of one or more polyacrylates, greater than or equal to about 0.10 wt. % to less than or equal to about 3 wt. % of one or more amines, and a balance of water. The one or more polyacrylates may include, for example, CARBOPOL® Ultrez 21 Polymer and/or AVALURE™ AC 210 Polymer. The one or more amines may include, for example, triethylamine or triethanolamine.

In certain aspects, the second mixture may further include one or more alcohols. For example, the second aqueous mixture may further comprise greater than or equal to about 5 wt. % to less than or equal to about 40 wt. % of one or more alcohols. The one or more alcohols may include, for example, ethanol.

In various aspects, forming the second aqueous mixture includes admixing the one or more polyacrylates and the triethylamine to form a first submixture, contacting the ethanol and water to the first submixture to form a second submixture, and admixing the second submixture to form a substantially homogeneous mixture that defines the second aqueous mixture. The first submixture may be substantially homogeneous.

The method further includes admixing the first aqueous mixture and the second aqueous mixture to form a substantially homogeneous mixture that defines the adhesive.

EXAMPLES

Embodiments and features of the present technology are further illustrated through the following non-limiting examples:

Example 1

An example gel adhesive was prepared in accordance with various aspects of the present disclosure. The example gel adhesive may be prepared by forming a first and second aqueous mixtures comprising as follows:

| Example 1 - First Aqueous Mixture | |
| --- | --- |
| about 10.00 wt. % | Glycerin (e.g., glycerol ($C_3H_8O_3$)) |
| about 0.80 wt. % | CARBOPOL ® Ultrez 21 Polymer |
| about 0.80 wt. % | Triethylamine |
| about 3.00 wt. % | PEG 300 |

-continued

| | |
|---|---|
| about 30 wt. % | K90 solution (20%) |
| about 11.90 wt. % | Ethanol |
| about 40.00 wt. % | Water |

| Example 1 - Second Aqueous Mixture | |
|---|---|
| about 1.16 wt. % | AVALURE ™ AC 210 Polymer |
| about 0.23 wt. % | Triethylamine |
| about 0.59 wt. % | Ethanol |
| about 1.52 wt. % | Water | and admixing the first and second aqueous mixtures to form a substantially homogeneous mixture that defines the example gel adhesive.

Example 2

An example gel adhesive was prepared in accordance with various aspects of the present disclosure. The example gel adhesive may be prepared by forming a first and second aqueous mixtures comprising as follows:

| Example 2 - First Aqueous Mixture | |
|---|---|
| about 8.25 wt. % | Glycerin (e.g., glycerol ($C_3H_8O_3$)) |
| about 0.70 wt. % | CARBOPOL ® Ultrez 21 Polymer |
| about 1.05 wt. % | Triethanolamine |
| about 3.00 wt. % | PEG 300 |
| about 39.40 wt. % | K90 solution (20%) |
| about 15.00 wt. % | Ethanol |
| about 25.00 wt. % | Water |

| Example 2 - Second Aqueous Mixture | |
|---|---|
| about 2.54 wt. % | AVALURE ™ AC 210 Polymer |
| about 0.51 wt. % | Triethanolamine |
| about 1.27 wt. % | Ethanol |
| about 3.28 wt. % | Water | and admixing the first and second aqueous mixtures to form a substantially homogeneous mixture that defines the example gel adhesive.

Example 3

An example gel adhesive was prepared in accordance with various aspects of the present disclosure. The example gel adhesive may be prepared by forming a first and second aqueous mixtures comprising as follows:

| Example 3 - First Aqueous Mixture | |
|---|---|
| about 4.00 wt. % | Glycerin (e.g., glycerol ($C_3H_8O_3$)) |
| about 0.70 wt. % | CARBOPOL ® Ultrez 21 Polymer |
| about 1.05 wt. % | Triethanolamine |
| about 4.00 wt. % | PEG 300 |
| about 35.00 wt. % | K90 solution (20%) |
| about 32.25 wt. % | Ethanol |
| about 15.00 wt. % | Water |

| Example 3 - Second Aqueous Mixture | |
|---|---|
| about 2.67 wt. % | AVALURE ™ AC 210 Polymer |
| about 0.54 wt. % | Triethanolamine |
| about 1.33 wt. % | Ethanol |
| about 3.46 wt. % | Water | and admixing the first and second aqueous mixtures to form a substantially homogeneous mixture that defines the example gel adhesive.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An adhesive for use on a user-to-mask interface of a respiratory mask, the adhesive comprising:
    greater than or equal to about 1 wt. % to less than or equal to about 15 wt. % of glycerol;
    greater than or equal to about 0.70 wt. % to less than or equal to about 3 wt. % of one or more polyacrylates;
    greater than or equal to about 1 wt. % to less than or equal to about 10 wt. % of one or more polyethers;
    greater than or equal to about 25 wt. % to less than or equal to about 45 wt. % of one or more N-vinylpyrrolidone polymers;
    greater than or equal to about 0.50 wt. % to less than or equal to about 2 wt. % of triethylamine;
    greater than or equal to about 10 wt. % to less than or equal to about 35 wt. % ethanol; and
    a balance of water.

2. The adhesive of claim 1, wherein the one or more polyethers comprises poly(ethylene glycol).

3. The adhesive of claim 1, wherein the one or more N-vinylpyrrolidone polymers comprises polyvinylpyrrolidone.

4. An adhesive for use on a user-to-mask interface of a respiratory mask, the adhesive comprising:
    greater than or equal to about 3 wt. % to less than or equal to about 12 wt. % of glycerol;
    greater than or equal to about 0.70 wt. % to less than or equal to about 3 wt. % of one or more polyacrylates;
    greater than or equal to about 2 wt. % to less than or equal to about 5 wt. % of poly(ethylene glycol);
    greater than or equal to about 30 wt. % to less than or equal to about 40 wt. % of polyvinylpyrrolidone;
    greater than or equal to about 0.50 wt. % to less than or equal to about 2 wt. % of triethylamine;
    greater than or equal to about 10 wt. % to less than or equal to about 35 wt. % ethanol; and
    a balance of water.

5. A method for forming the adhesive of claim 1 for use on a user-to-mask interface of a respiratory mask, the method comprising:
    forming a first aqueous mixture comprising:
        glycerol,
        a first amount of one or more polyacrylates,
        one or more polyethers,
        one or more N-vinylpyrrolidone polymers, and
        a balance of water;
    forming a second aqueous mixture comprising:
        a second amount of one or more polyacrylates,
        triethylamine,
        ethanol, and
        a balance of water; and
    admixing the first aqueous mixture and the second aqueous mixture to form a substantially homogeneous mixture that defines the adhesive of claim 1.

6. The method of claim 5, wherein the one or more polyethers comprises poly(ethylene glycol) and the one or more N-vinylpyrrolidone polymers comprises polyvinylpyrrolidone.

7. The method of claim 6, wherein forming the second aqueous mixture comprises:
  admixing the second amount of one or more polyacrylates and triethylamine to form a first submixture;
  contacting ethanol and water to the first submixture to form a second submixture; and
  admixing the second submixture to form a substantially homogeneous mixture that defines the second aqueous mixture.

8. The method of claim 5, wherein the first mixture further comprises: one or more amines and one or more alcohols.

9. The method of claim 8, wherein forming the first aqueous mixture comprises:
  admixing glycerol and water to form a first submixture;
  admixing the first submixture and the first amount of one or more polyacrylates to form a second submixture;
  admixing the second submixture and the one or more amines to form a third submixture; and
  admixing the third submixture and the one or more polyethers, the one or more N-vinylpyrrolidone polymers, and the one or more alcohols to form a substantially homogeneous mixture that defines the first aqueous mixture.

* * * * *